(12) United States Patent
Gloudemans et al.

(10) Patent No.: US 6,625,968 B2
(45) Date of Patent: Sep. 30, 2003

(54) LAWNMOWER CYLINDER STOP

(75) Inventors: Brian K. Gloudemans, Little Chute, WI (US); George Leslie Cooke, IV, Appleton, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 10/186,025

(22) Filed: Jun. 27, 2002

(65) Prior Publication Data

US 2002/0166313 A1 Nov. 14, 2002

Related U.S. Application Data

(62) Division of application No. 09/698,935, filed on Oct. 27, 2000, now abandoned.

(51) Int. Cl.⁷ .................. A01D 34/03; A01D 34/43; A01D 34/64
(52) U.S. Cl. ......................... 56/17.1; 56/15.2
(58) Field of Search .................. 56/17.1, 6, 15.2, 56/15.5, 15.8, 15.9, DIG. 14, DIG. 22; 172/4, 413; 180/300; 92/18

(56) References Cited

U.S. PATENT DOCUMENTS

| | | | |
|---|---|---|---|
| 2,822,654 A | | 2/1958 | Elfes et al. |
| 3,667,347 A | * | 6/1972 | Patrick ...................... 91/404 |
| 3,967,539 A | | 7/1976 | Williamson |
| 4,135,349 A | | 1/1979 | Schwertner |
| 4,441,306 A | | 4/1984 | Kuhn |
| 4,442,658 A | | 4/1984 | Cartner |
| 4,760,686 A | | 8/1988 | Samejima et al. |
| 5,024,303 A | | 6/1991 | Kosloff |
| 5,277,257 A | | 1/1994 | Thompson et al. |
| 5,335,396 A | | 8/1994 | Dolan |
| 5,417,042 A | | 5/1995 | Walch et al. |
| 5,816,035 A | * | 10/1998 | Schick ...................... 56/15.2 |

* cited by examiner

Primary Examiner—Árpád Fábián Kovács
(74) Attorney, Agent, or Firm—Michael Best & Friedrich LLP

(57) ABSTRACT

An actuating cylinder assembly includes a cylinder adapted to contain a fluid, such as hydraulic fluid or air, a piston shaft movable with respect to the cylinder in response to the removal of fluid from the cylinder and the injection of fluid into the cylinder, and a cylinder stop including a handle portion and a clamping portion releasably engaging the piston shaft, the clamping portion resisting movement of the piston shaft with respect to the cylinder past a selected point. The actuating cylinder assembly used, for example, on a riding lawnmower to set a selected minimum cutting height. Once the cylinder stop is set on the piston shaft, the cutting deck may be raised to avoid obstacles and then quickly lowered to the selected cutting height.

17 Claims, 3 Drawing Sheets

LAWNMOWER CYLINDER STOP

This is a divisional patent application of U.S. patent application Ser. No. 09/698,935 filed Oct. 27, 2000, now abandoned.

FIELD OF THE INVENTION

The invention relates to a cylinder stop for any hydraulic or pneumatic cylinder, and specifically for a lawnmower employing such an hydraulic or pneumatic cylinder.

BACKGROUND

It is known to provide a lawnmower with an hydraulic cylinder that controls the height of the cutting deck. When the lawnmower approaches an obstacle that requires the cutting deck to be lifted to avoid striking an object with the lawnmower's cutting blades, the hydraulic cylinder is actuated. After the lawnmower has moved over the object, the hydraulic cylinder is again actuated in the reverse direction, thereby lowering the cutting deck to resume cutting the grass.

SUMMARY

A problem with prior art lawnmowers is that an operator must guess at the cutting position of the lawnmower deck each time the deck is raised and lowered. Prior art lawnmowers may therefore cut grass at two or more different lengths due to the cutting deck being raised and lowered to overcome various obstacles. This may require portions of the lawn to be cut twice or more times before the lawn is evenly cut.

The present invention provides a cylinder stop detachably connected to the piston shaft of an actuating cylinder. The cylinder stop includes a clamping portion and a handle portion.

The clamping portion may be made of resilient material or may be rigid. Preferably, the clamping portion is resilient and includes a pair of horns defining a mouth leading to a bore through the clamping portion. When pushed against the piston shaft, the horns deflect, permitting the piston shaft to move into the bore. The diameter of the bore is preferably slightly less than the diameter of the piston shaft to ensure a snug fit of the piston shaft in the bore. The clamping portion resists movement of the piston shaft into or out of the cylinder by resisting compressive forces on the clamping portion caused by the actuating cylinder.

The handle facilitates attachment and withdrawal of the cylinder stop with respect to the piston shaft. The handle is preferably T-shaped, but may be any suitable shape that is easily grasped by an operator of the actuating cylinder. The handle is preferably formed integrally with the clamping portion.

Other features and advantages of the invention will become apparent to those skilled in the art upon review of the following detailed description, claims, and drawings.

BRIEF DESCRIPTION OF THE DRAWINGS

FIG. 6 is an enlarged view of a cylinder stop in use.

Figure 1:
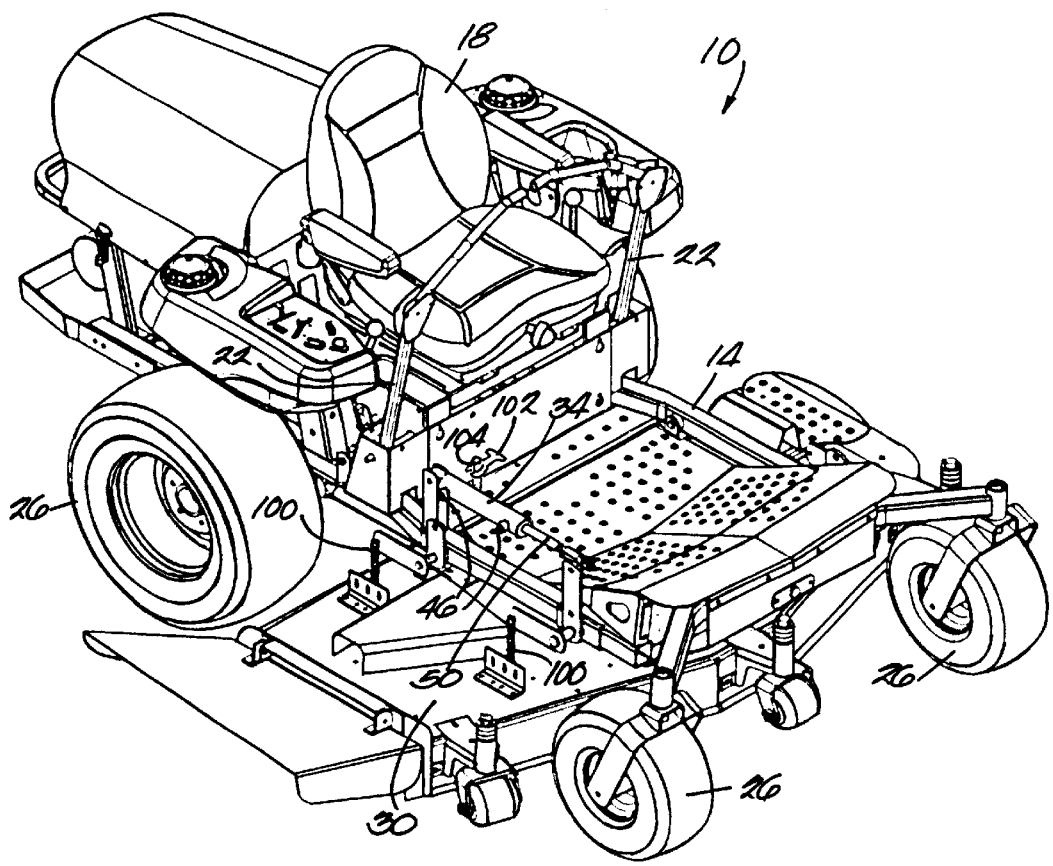
FIG. 1 is a perspective view of a lawnmower embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 2:
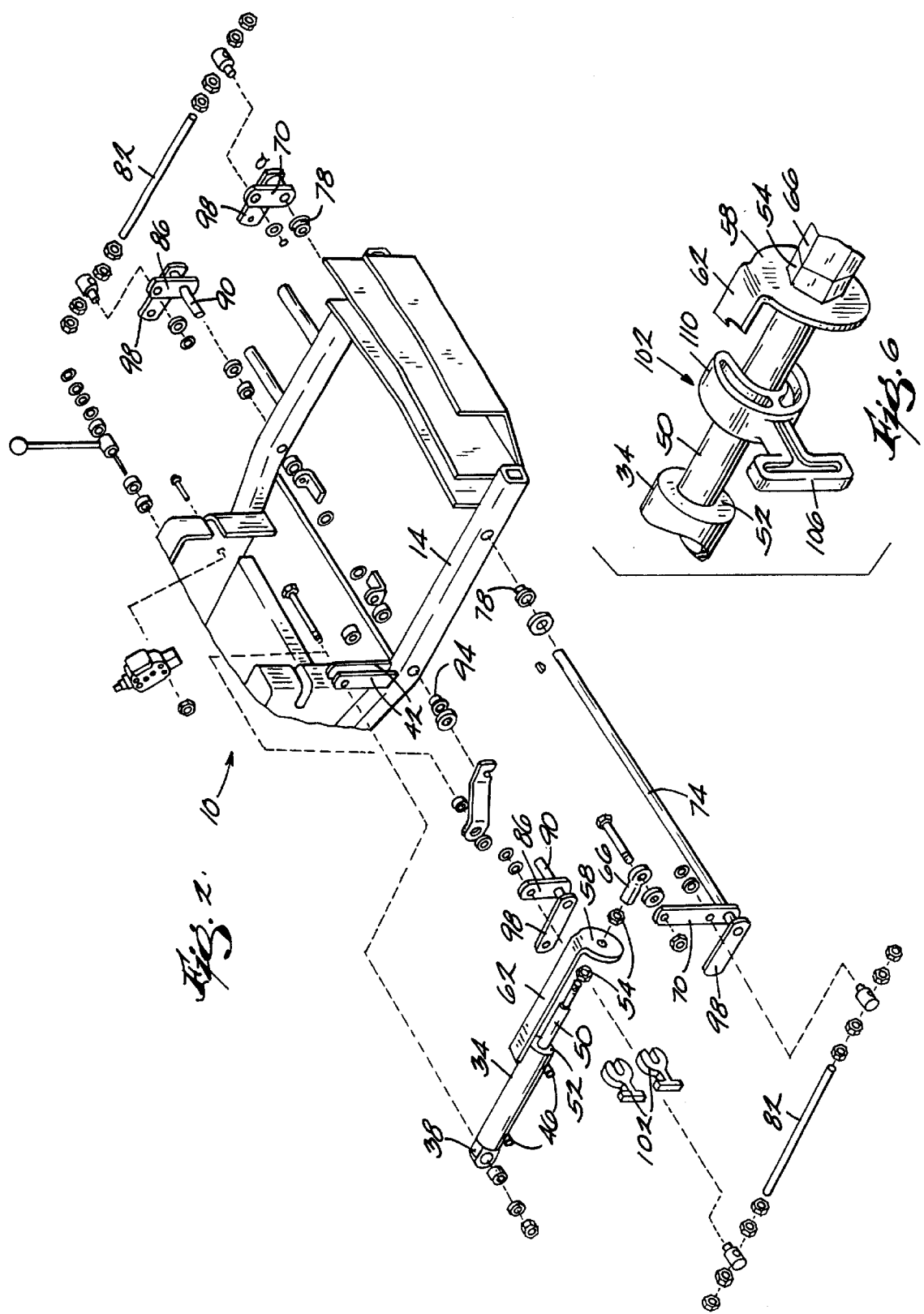
FIG. 2 is an exploded view of a portion of the lawnmower.

FIGS. 1 and 2 illustrate a lawnmower 10 including a chassis 14, a seat 18 for an operator to sit in, a pair of control levers 22, four wheels 26, a cutting deck 30, and a deck lift assembly. Although the illustrated lawnmower 10 is a riding lawnmower, it is possible to use a deck lift assembly on a walk-behind lawnmower, and the invention is therefore not limited to riding lawnmowers. In fact, the present invention is useful in any machinery using hydraulic or pneumatic cylinders (collectively referred to herein as "actuating cylinders"), where it is desirable to quickly and accurately reset the cylinder to a particular setting.

The illustrated deck lift assembly includes an hydraulic cylinder 34 having a first end 38 fixed to a post or a pair of flanges 42 that are mounted to the chassis 14. A pair of bosses 46 on the cylinder 34 receive hydraulic hoses for operation of the cylinder 34. A piston shaft 50 extends out of a second end 52 of the cylinder 34 and reciprocates in response to hydraulic fluid being pumped into or removed from the cylinder 34. In this regard, the hydraulic cylinder 34 is preferably a double-acting cylinder.

FIG. 2 illustrates other aspects of the deck lift assembly. Threaded onto the end of the piston shaft 50 are a pair of jam nuts 54. The jam nuts 54 sandwich a disk 58. Extending from the disk 58 over the cylinder 34 is a height-of-cut strap 62. The top surface of the cylinder 34 includes markings corresponding to the height of the lawnmower deck 30. When viewed from above (e.g., from the position of one sitting in the seat 18), the end of the strap 62 aligns with the markings on the cylinder 34 and moves with the cylinder shaft 50 to indicate the height of the mower deck 30.

Also threaded onto the end of the piston shaft 50 is a rod end 66 having a bearing or ball joint. A bolt, pin, or other fastener extends through the joint and fastens the joint to the top end of a first vertical link 70. The first vertical link 70 is supported at its lower end by a mower lift shaft 74, and the mower lift shaft 74 is supported for rotation with respect to the chassis 14 by a pair of nylon flange bushings 78. The first vertical link 70 is keyed, welded, fastened, or otherwise fixed for rotation with the mower lift shaft 74. The first vertical link 70 and mower lift shaft 74 are thus pivoted about the mower lift shaft longitudinal axis in response to linear reciprocation of the piston shaft 50.

A horizontal lift assist rod 82 is pinned at a first end to the first vertical link 70 and pinned at a second end to a second vertical link 86. The second vertical link 86 is supported by a stub shaft 90 to which it is fixed for rotation, and the stub shaft 90 is supported for rotation with respect to the chassis 14 by nylon flange bushings 94. A pair of horizontal links 98 are fixed for rotation with the respective mower lift shaft 74 and stub shaft 90. A length of chain 100 (FIG. 1) hangs from the free ends of the horizontal links 98 and is attached to the deck 30. A similar linkage is positioned at the other side of the lawnmower 10, and the same reference numerals are used for similar parts.

Through the above-described linkage, the deck 30 is raised in response to the piston shaft 50 being extended out of the hydraulic cylinder 34, and is lowered in response to the piston shaft being retracted into the hydraulic cylinder 34. A plurality of cylinder stops 102 are stored on a post 104 (FIG. 1) positioned generally behind the right leg of an operator of the lawnmower 10 when the operator is seated in the seat 18. As discussed in further detail below, the cylinder stops 102 may be attached to the piston shaft 50 and are sandwiched between the disk 58 and the end of the cylinder 34 to limit the extent to which the piston shaft 50 may be retracted into the cylinder 34. It should be noted, however, that the invention is not limited to limiting travel of the piston shaft into the cylinder, as the cylinder stops may also be configured to limit travel of the piston shaft out of the cylinder.

Figure 3:
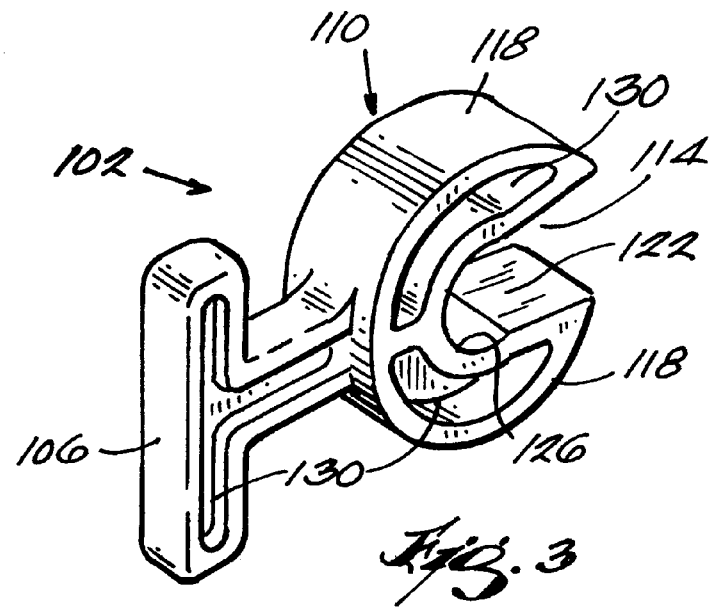
FIG. 3 is a perspective view of a cylinder stop.
Figure 4:
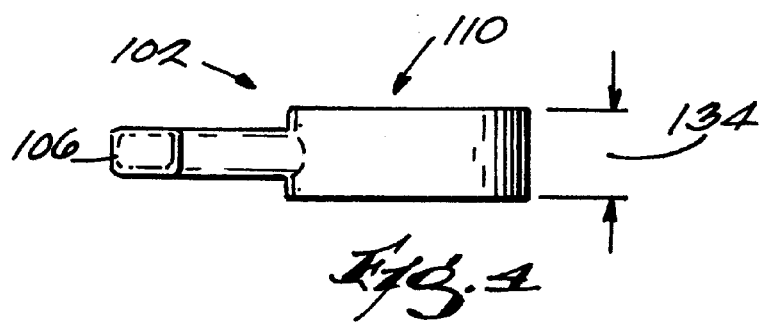
FIG. 4 is a top view of the cylinder stop of FIG. 3.
Figure 5:
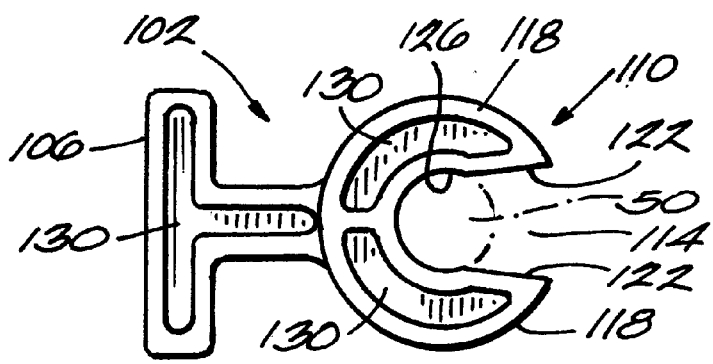
FIG. 5 is a front view of the cylinder stop of FIG. 3.

One cylinder stop 102 is illustrated in FIGS. 3–5, and includes a handle portion 106 and a clamping portion 110. The handle portion 106 is preferably T-shaped as illustrated, and is integrally formed with the clamping portion 110. The handle portion 106 facilitates removing the cylinder stop 102 from and attaching the cylinder stop 102 to the storage post 104 and the piston shaft 50. The handle portion 106 may take on other shapes and may have holes for the fingers of the operator to further facilitate the operator's grip on the cylinder stop 102. Alternatively, the handle portion 106 may be provided as a detachable member that includes a quick connect/disconnect mechanism. In such a construction, a single handle portion 106 could be used to grasp and move several different clamping portions 110.

The illustrated clamping portion 110 is generally cylindrical in shape, and includes a mouth 114 that is defined by a pair of horns 118 having ramped surfaces 122 to guide the piston shaft 50 into the mouth 114. The mouth 114 opens to a bore 126 extending through the clamping portion 110. The bore 126 is substantially circular when viewed from the end as shown in FIG. 5, and has a diameter substantially equal to or slightly less than the diameter of the piston shaft 50 to ensure a snug fit of the piston shaft 50 in the bore 126. To reduce weight and to increase flexibility of the cylinder stop 102, cavities 130 are formed in the sides of the clamping and handle portions 110, 106.

The cylinder stops 102 are constructed of material that has a compressive rigidity sufficient to resist being crushed by the hydraulic cylinder 34 as the hydraulic cylinder attempts to retract the piston shaft 50 into the cylinder 34. The cylinder stop material is also resilient enough to permit very small deflections in the horns 118 and bore 126 to accommodate the piston shaft 50 and provide a snug fit on the piston shaft 50. Alternatively, the clamping portion 110 may be constructed of a rigid material, and may include a latching mechanism for latching the clamping portion 110 onto the piston shaft 50, or may include a one-piece or multiple-piece clamping portion 110 that is fastened to the piston shaft 50.

The thickness 134 of the clamping portion 110 of the cylinder stop 102 preferably corresponds to a desired incremental deck height. For example, the clamping portion 110 may have a thickness 134 that corresponds to a quarter-inch of deck height such that, for each stop 102 positioned on the piston shaft 50, the minimum height of the deck 30 will be raised by a quarter inch. A cylinder stop 102 having a clamping portion 110 of a thickness that corresponds to a half-inch of deck height may also be provided. The lawnmower operator may therefore choose a desired deck height for cutting a particular lawn, and attach the appropriate number and combination of cylinder stops 102 to the piston shaft 50 corresponding to that desired deck height.

The cylinder stops 102 do not prevent the deck 30 from being raised, and the operator may therefore raise the deck 30 to avoid objects in the lawn or when traveling across a driveway, sidewalk, or parking lot. When it is time to again lower the deck 30, the operator actuates the hydraulic cylinder 34 such that the piston shaft 50 is retracted into the cylinder 34 until the cylinder stop or stops 102 are sandwiched between the end 52 of the cylinder 34 and the disk 58. In this manner, the operator may quickly and accurately reset the deck height to the desired cutting height.

What is claimed is:

1. A method for adjusting the minimum cutting deck height of a lawnmower including an actuating cylinder, and a piston rod extending out of the cylinder, the method comprising:

rigidly affixing a range of motion limiter to the piston rod;

providing a plurality of cylinder stops each including a clamping portion and a handle portion;

releasably and slidably interconnecting the clamping portions of the cylinder stops to the piston rod between the limiter and an end of the cylinder;

retracting the piston rod into the cylinder;

abutting one of the cylinder stops against the cylinder end;

after said abutting step, continuing to retract the piston rod into the cylinder while sliding the piston rod with respect to the cylinder stops; and squeezing the cylinder stops between the limiter and the cylinder end to prevent further retraction of the piston rod.

2. The method of claim 1, wherein said act of providing includes providing the cylinder stops in various thicknesses corresponding to selected minimum cutting deck heights.

3. The method of claim 1, wherein said act of providing includes constructing the cylinder stops of a resilient material, and wherein said act of releasably and slidably interconnecting includes pressing the clamping portion of each cylinder stop against the piston rod to cause a portion of the clamping portion to deflect and snugly receive the piston rod.

4. The method of claim 1, wherein said act of providing includes constructing each cylinder stop of a resilient material, wherein the clamping portion has a pair of horns defining a mouth, and a bore extending through the clamping portion and communicating with the mouth, and wherein said act of releasably and slidably interconnecting includes at least partially deflecting the horns to permit insertion of the piston rod into the mouth and bore.

5. A method for adjusting the minimum cutting deck height of a lawnmower including an actuating cylinder, a piston rod extending out of the cylinder, and a flange connected to the piston rod, the method comprising:

providing a cylinder stop including a clamping portion;

releasably affixing the clamping portion of the cylinder stop to the piston rod;

actuating the piston rod with respect to the cylinder; and squeezing the cylinder stop between the flange and an abutting surface to limit the extent to which the piston rod can be moved in at least one direction with respect to the cylinder;

wherein said squeezing step is executed without using the cylinder stop to actuate a switch on the actuating cylinder.

6. The method of claim 5, wherein the act of actuating includes retracting the piston rod into the cylinder.

7. The method of claim 6, wherein the act of actuating further comprises moving the cylinder stop with the piston rod as the piston rod is retracted into the cylinder.

8. The method of claim 7, wherein the act of actuating further comprises abutting the cylinder with the cylinder stop.

9. The method of claim 8, further comprising after the abutting step, continuing to retract the piston rod into the cylinder and sliding the cylinder stop with respect to the piston rod.

10. The method of claim 6, wherein the cylinder includes the abutting surface, and the act of squeezing includes abutting opposite sides of the cylinder stop with the flange and the abutting surface to limit the retraction of the piston rod into the cylinder.

11. The method of claim 6, wherein the act of retracting lowers the lawnmower cutting deck, and the act of squeezing stops the retracting step.

12. The method of claim 5, wherein the act of actuating includes extending the piston rod out of the cylinder.

13. The method of claim 12, wherein the abutting surface is connected to the lawnmower such that the flange is between the abutting surface and the cylinder, and the act of actuating includes moving the piston rod with respect to the abutting surface, and the act of squeezing includes squeezing the cylinder stop between the flange and the abutting surface to limit the extension of the piston rod out of the cylinder.

14. The method of claim 5, wherein the act of providing includes providing a plurality of cylinder stops, and the act of releasably affixing includes releasably affixing the clamping portions of a selected number of cylinder stops to the piston rod.

15. A method for adjusting the minimum cutting deck height of a lawnmower including an actuating cylinder, a piston rod extending out of the cylinder, and a flange connected to the piston rod, the method comprising:

providing a cylinder stop including a clamping portion;

releasably affixing the clamping portion of the cylinder stop to the piston rod;

retracting the piston rod into the cylinder;

moving the cylinder stop with the piston rod as the piston rod is retracted into the cylinder; then abutting the cylinder with the cylinder stop; then continuing to retract the piston rod into the cylinder and sliding the cylinder stop with respect to the piston rod; and abutting a side of the cylinder stop facing away from the cylinder with the flange and squeezing the cylinder stop between the cylinder and the flange to limit further retraction of the piston rod into the cylinder.

16. The method of claim 15, wherein the act of retracting lowers the lawnmower cutting deck, and the act of abutting and squeezing limits the lowering of the cutting deck.

17. The method of claim 15, wherein the act of providing includes providing a plurality of cylinder stops, and the act of releasably affixing includes releasably affixing the clamping portions of a selected number of cylinder stops to the piston rod.

* * * * *